United States Patent
Parfrey

(10) Patent No.: US 8,413,319 B2
(45) Date of Patent: Apr. 9, 2013

(54) APPARATUS FOR FORMING ELONGATED COMPOSITE TUBULAR

(75) Inventor: Karl Parfrey, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 288 days.

(21) Appl. No.: 12/846,598

(22) Filed: Jul. 29, 2010

(65) Prior Publication Data

US 2012/0023725 A1 Feb. 2, 2012

(51) Int. Cl.
*B23P 23/00* (2006.01)
*B05C 11/11* (2006.01)

(52) U.S. Cl.
USPC ............... 29/819; 29/820; 29/419.1; 29/458; 29/527.2; 118/118

(58) Field of Classification Search ............... 29/419.1, 29/458, 527.2, 819, 820; 118/118, 419, 420, 118/425, 426, 428, 429
See application file for complete search history.

(56) References Cited

U.S. PATENT DOCUMENTS 3,215,576 A 11/1965 Huff

FOREIGN PATENT DOCUMENTS

| FR | 1372120 A | 9/1964 |
| JP | 8108487 A | 4/1996 |

OTHER PUBLICATIONS

Search Report and Written Opinion dated Mar. 16, 2012 from corresponding EP Application No. 11174784.6.

*Primary Examiner* — Jermie Cozart

(74) *Attorney, Agent, or Firm* — Bracewell & Giuliani LLP

(57) ABSTRACT

A method and apparatus for forming an elongate tubular from a composite material. The composite material includes fibers and epoxy resin that are disposed around an elongated mandrel. The fibers are wound around the outer circumference of the mandrel and the epoxy resin may be applied to the fibers, before, during, or after, being wound onto the mandrel. A trough is provided that supports the mandrel between ends of the mandrel. An example trough includes a flexible membrane supported on its lateral ends to resemble a catenary.

13 Claims, 4 Drawing Sheets

APPARATUS FOR FORMING ELONGATED COMPOSITE TUBULAR

FIELD OF THE INVENTION

This invention relates in general to a method and apparatus for forming a composite member. More specifically, the present invention relates to a method and apparatus for forming an elongated tubular member from composite constituents.

DESCRIPTION OF RELATED ART

Tubular composite members may be formed by winding a composite filament of fibers and a polymer matrix around a cylindrical mandrel. Typically, the polymer matrix includes a resin, such as an epoxy resin. After winding the composite filament of fibers and matrix around the mandrel, the composite is cured and then removed from the mandrel. An example of a prior art filament winding system is shown in a schematic view in FIG. 1. In this example, the filament winding system 10 includes a frame 12 on which a mandrel 14 is horizontally disposed. One end of the mandrel 14 is mounted into a tailstock 16 with its opposing end in a headstock 18. The tailstock 16 rotates freely with respect to the frame and the headstock 18 is driven by a motor 20 shown attached to the headstock 18 by a drive shaft 22. Thus the mandrel 14 may be rotated by energizing the motor 20 to rotate the headstock 18 with the coupled shaft 22 that in turn rotates the mandrel 14.

In the example of FIG. 1, a composite tubular 24 is being formed on the mandrel 14. A rail system 26 is provided with the frame 12 on which a creel assembly 28 slides and is supported. The creel assembly 28 is shown equipped with a series of spools or bobbins 30 having filaments 32 that are fed to the mandrel 14 through a feed eye 33. As is known, the filaments 32 can include fibers such as natural cotton fibers as well as man-made which include carbon, graphite, and aramid fibers. The filaments 32 may be made up of thousands of individual fibers combined in parallel; which is often referred to as a tow. The creel assembly 28 travels lengthwise on the rail 26 and adjacent the mandrel 14 for feeding the filaments 32 onto the mandrel 14 to create plies or layers of filaments 32 onto the mandrel 14 that is combined with the polymer matrix and used to form the composite tubular 24. Coordinating the rotation speed of the mandrel 14 with the transverse speed of the creel assembly 28 will produce a defined helical angle at which the filaments 32 are wound onto the mandrel 14. The polymer matrix may be supplied through an epoxy resin system 34 shown having a reservoir and/or pump attached to a line 36 that feeds a resin bath 38. The filaments 32 pass through the bath 38 prior to being wound onto the mandrel 14 thereby being impregnated with the polymer matrix and forming the composite.

Presently known systems for forming composite tubulars experience a drawback when used to form substantially elongate composite tubulars. FIG. 1A graphically illustrates vertical forces acting on the mandrel 14 of FIG. 1. The force $F_A$ represents the force from gravitational acceleration and forces $F_{16}$ and $F_{18}$ represent support forces provided respectively at the tailstock 16 and headstock 18. Since elongate tubulars tend to sag in their mid portion when supported on their ends; and the filament winding system 10 of FIG. 1 supports a mandrel 14 on its ends, an elongate mandrel used for forming a composite tubular also sags in the mid portion. A sagging mandrel causes inconsistencies in the side wall of any elongate composite tubular formed thereon. Examples of inconsistencies include wrinkles and uneven spacing of filament within a ply or layer; both of which compromise composite tubular quality and structural performance.

SUMMARY OF INVENTION

Disclosed herein is an example of a filament winding system having a frame, a flexible membrane trough that is supported along lateral sides of the flexible membrane, a rotatable mandrel having opposing ends mounted in the frame and at least a lengthwise portion of the mandrel between the opposing ends supported in the trough, a filament source, and filaments extending from the filament source onto the outer surface of the mandrel, so that when the mandrel is rotated and the filament source reciprocated the filaments wind around the mandrel to form a composite tubular.

Also disclosed herein is a method of forming a composite tubular. In an example, the method includes supporting a length of a mandrel with a substantially continuous flexible membrane, so that the mandrel is substantially straight, winding composite filaments of fibers impregnated with a polymer matrix around the mandrel, and separating the composite of fibers and polymer matrix from the mandrel to provide a substantially straight composite tubular.

Yet further disclosed is an example of a filament winding system that in an embodiment, is made up of a frame, a flexible membrane trough that is supported along lateral sides of the flexible membrane, an elongated rotatable mandrel having opposing ends mounted in the frame and at least a lengthwise portion of the mandrel between the opposing ends supported in the trough, and that when unsupported between the opposing ends, the lengthwise portion of the mandrel sags below the opposing ends, a filament source, and filaments extending from the filament source onto the outer surface of the mandrel, so that when the mandrel is rotated and the filament source reciprocated the filaments wind around the mandrel to form a composite tubular.

DETAILED DESCRIPTION OF THE INVENTION

Figure 1:
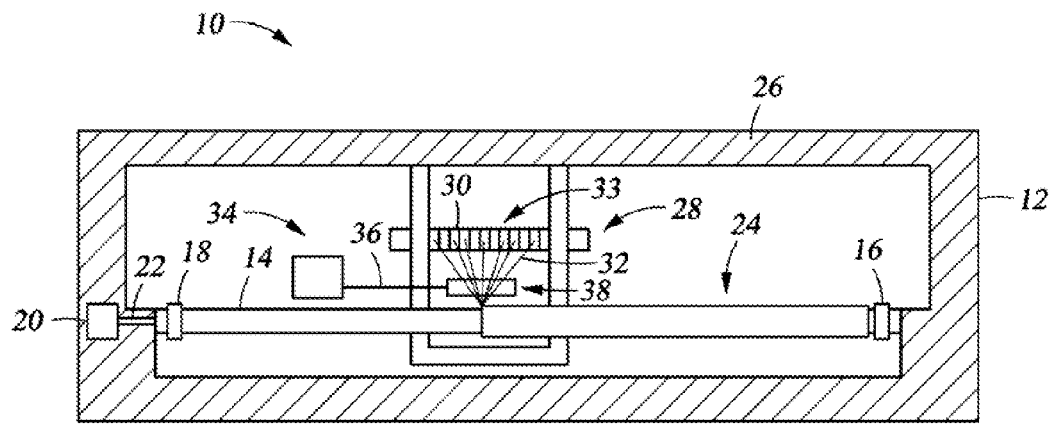
FIG. 1 is a schematic view of a prior art filament winding system.

The apparatus and method of the present disclosure will now be described more fully hereinafter with reference to the accompanying drawings in which embodiments are shown. This subject of the present disclosure may, however, be embodied in many different forms and should not be construed as limited to the illustrated embodiments set forth herein; rather, these embodiments are provided so that this disclosure will be thorough and complete, and will fully convey the scope of the invention to those skilled in the art.

Like numbers refer to like elements throughout. For the convenience in referring to the accompanying figures, directional terms are used for reference and illustration only. For example, the directional terms such as "upper", "lower", "above", "below", and the like are being used to illustrate a relational location.

It is to be understood that the subject of the present disclosure is not limited to the exact details of construction, operation, exact materials, or embodiments shown and described, as modifications and equivalents will be apparent to one skilled in the art. In the drawings and specification, there have been disclosed illustrative embodiments of the subject disclosure and, although specific terms are employed, they are used in a generic and descriptive sense only and not for the purpose of limitation. Accordingly, the subject disclosure is therefore to be limited only by the scope of the appended claims.

Figure 2:
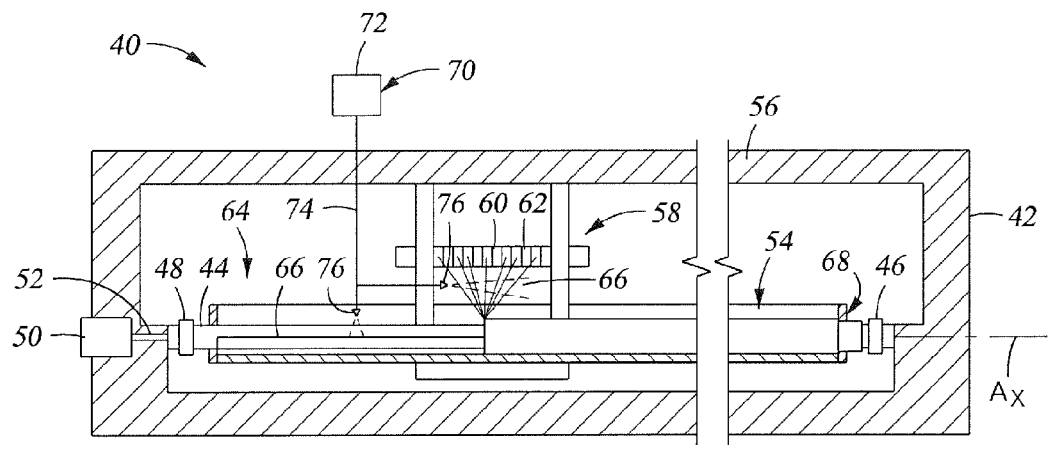
FIG. 2 is a schematic partial sectional view of an example of a filament winding system in accordance with the present disclosure.

FIG. 2 illustrates an example of a filament winding system 40 in accordance with the present disclosure. In the example of FIG. 2, the filament winding system 40 is shown in a side schematic and partial sectional view. The filament winding system 40 includes a frame 42 on which a cylindrical mandrel 44 is horizontally mounted. One end of the mandrel 44 couples with a tailstock 46 shown within the frame and coaxial along an axis $A_X$. The end of the mandrel 44 opposite the tailstock 46 is shown coupling coaxially with a headstock 48. A motor 50 is schematically illustrated that is connected to the headstock 48 via a drive shaft 52. In the example of FIG. 2, a composite tubular 54 is in the process of being formed on the outer surface of the mandrel 44. A rail assembly 56 on the frame 42, provides support for a creel assembly 58 above the mandrel 44 and defines a path along the length of the mandrel 44 for repeated end to end travel of the creel assembly 58. Spools 60 provided with the creel assembly 58 dispense filaments 62 in a designated pattern onto the mandrel 44. A trough assembly 64 is shown supporting the mandrel 44 of FIG. 2 along a portion of the length of the mandrel 44 and disposed between the ends of the mandrel 44. The presence and supporting force of the trough assembly 64 prevents sag in the mandrel 44 so the mandrel 44 can maintain a substantially straight axis $A_X$. Accordingly, the composite tubular 54 formed on the mandrel 44 also circumscribes a substantially straight axis $A_X$.

Included within the trough 64 is a level of liquid polymer matrix 66. The polymer matrix 66 combines with the filaments 62 to form a composite. Examples of a polymer matrix 66 include an epoxy resin or other impregnating resin. In addition to impregnating the filaments 62, the polymer matrix 66, can also make up a film layer between the mandrel 44 and the trough 64. Without the film layer, the mandrel 44 would otherwise be in contact with a surface of the trough 64. Similarly, on the portion of the mandrel 44 having the composite tubular 54, the polymer matrix 66 can also provide a film layer between the outer surface of the composite tubular 54 and trough 64. The ends of the trough 64, shown oriented transverse to the axis $A_X$, include openings fitted with seals 68 that circumscribe the mandrel 44 and prevent the polymer matrix 66 from leaking from within the trough 64.

The polymer matrix 66 may be supplied from a resin delivery system 70 shown having a reservoir and pump 72 attached to a supply line 74. The supply line 74 can supply polymer matrix directly to the trough 64, onto the filaments 62, or both. In the embodiment of FIG. 2, the polymer matrix is shown being discharged from a nozzle 76 and into the trough 64. However, other embodiments exist wherein the filaments 62 pass through a polymer matrix bath prior to being wound onto the mandrel 44.

Figure 3:
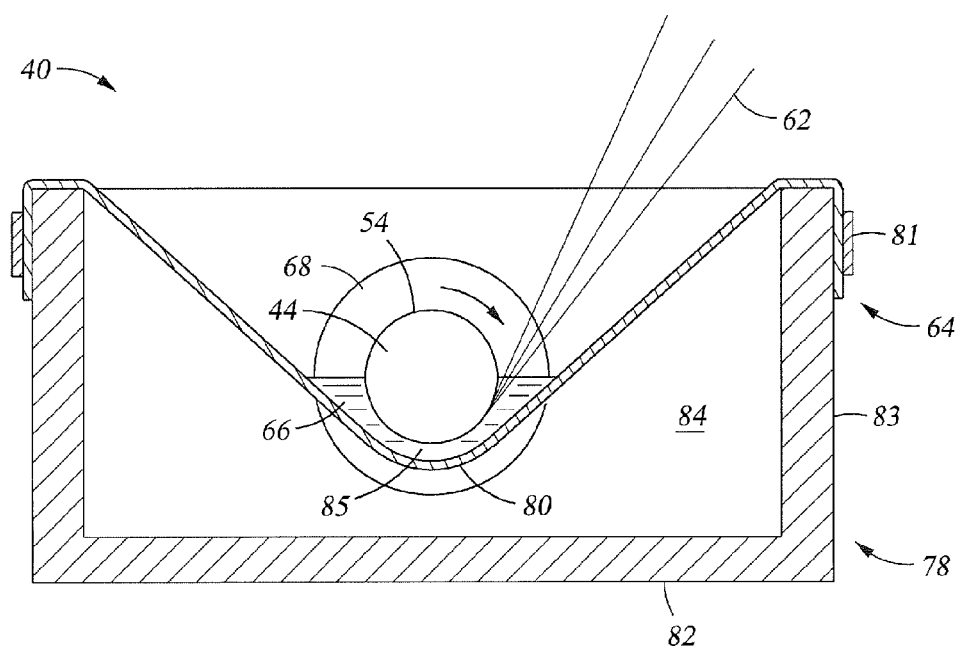
FIG. 3 is a side sectional view of a portion of the filament winding system of FIG. 2.

An axial sectional view of a portion of the filament winding system 40 of FIG. 2 is provided in FIG. 3. In this example, the mandrel 44 is shown circumscribed by impregnated windings 62 that form a portion of a composite tubular 54. The mandrel 44 and composite tubular 54 are shown partially submerged in a bath of polymer matrix 66 while additional filaments 62 is being provided onto the mandrel 44. Rotation, as indicated by the arrow, of the mandrel 44 and composite tubular 54 draws the filaments 62 from the creel assembly 58 and onto the mandrel 44. The trough assembly 64 is made up of an outer housing 78 and flexible membrane 80 held to the housing 78 by coupling mounts 81. In an embodiment, the housing 78 is substantially rigid. As shown in FIG. 3, the outer housing 78 has a horizontally disposed lower member 82 and sidewalls 83 upwardly extending from lateral sides of the lower member 82. The flexible membrane 80 is supported from an end of the sidewalls 83 opposite the lower member 82. The coupling mounts 81 are shown schematically attaching lateral ends of the flexible membrane 80 onto outer lateral surfaces of the sidewalls 83. The membrane 80 and housing 78 can have substantially the same length.

The housing 78 and membrane 80 define an enclosed space 84 therebetween. In one alternative example, the space 84 may be pressurized thereby providing additional support for the membrane 80. Examples of pressurization can include introducing a fluid into the space 84, such as air, nitrogen, water, or the like. Also evident from the example of FIG. 3, is a film 85 between the mandrel 44 and composite tubular 54 and the surface of the membrane 80. Presence of the film 85 provides a liquid interface on the lower-facing surface of the mandrel 44 or composite tubular 54, thereby reducing rotational friction during the forming process. An additional advantage of the film 85 is that inconsistency in either the mandrel 44 or membrane 80 may result in localized high stress contact between the mandrel 44 and membrane 80. Presence of the film 85, however, can compensate for these material inconsistencies so that a substantially constant upward force is exerted onto the mandrel 44 from the membrane 80. As the outer diameter of the mandrel 44 and composite tubular 54 increases due to added fiber 62, the flexible membrane 80 can deflect downward so that the centerline axis $A_X$ remains substantially straight; while continuing to support the mandrel 44 and composite tubular 54. In an alternative example, centerline axis $A_X$ can be maintained substantially straight by varying the pressure in the space 84 as the thickness of the composite tubular 54 increases.

Figure 1A:
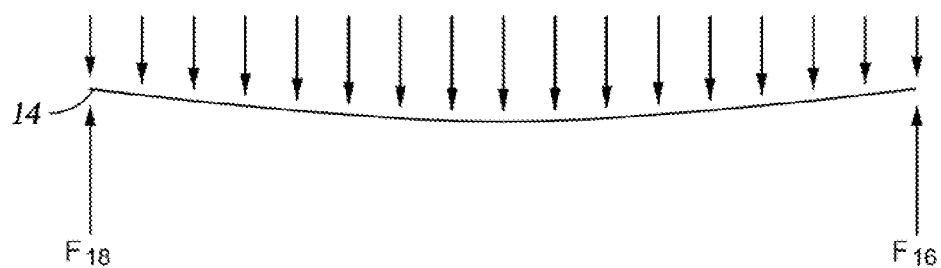
FIG. 1A is a force diagram of a portion of the filament winding system of FIG. 1.
Figure 3A:
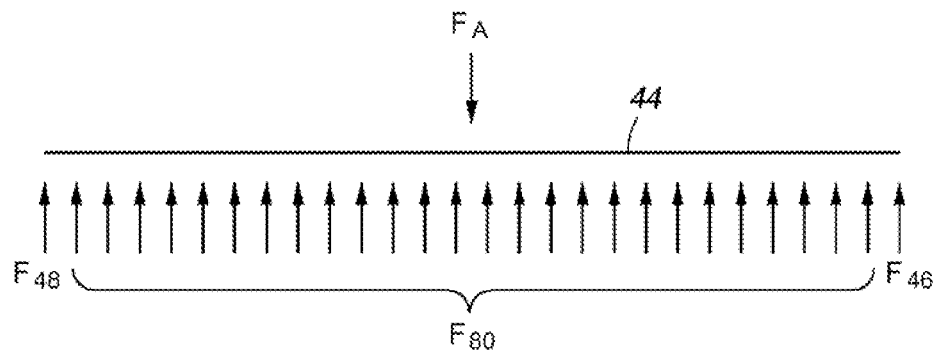
FIG. 3A is a force diagram of a portion of the filament winding system of FIG. 2.

FIG. 3A graphically illustrates a force diagram of vertical forces acting along the length of the mandrel 44 of FIGS. 2 and 3. The force due to gravity $F_A$ is shown directed downward along the length of the mandrel 44. Countering the gravitation force $F_A$ are forces where the mandrel 44 is held by the tailstock and headstock $F_{46}$, $F_{48}$ and the force $F_{80}$ from the membrane 80. In the example of FIG. 3A, the force $F_{80}$ from the membrane 80 is distributed along the length of the mandrel 44 so that the tailstock and headstock forces $F_{46}$, $F_{48}$ may be reduced over the tailstock and headstock forces $F_{16}$, $F_{18}$ depicted in FIG. 1A.

Figure 4:
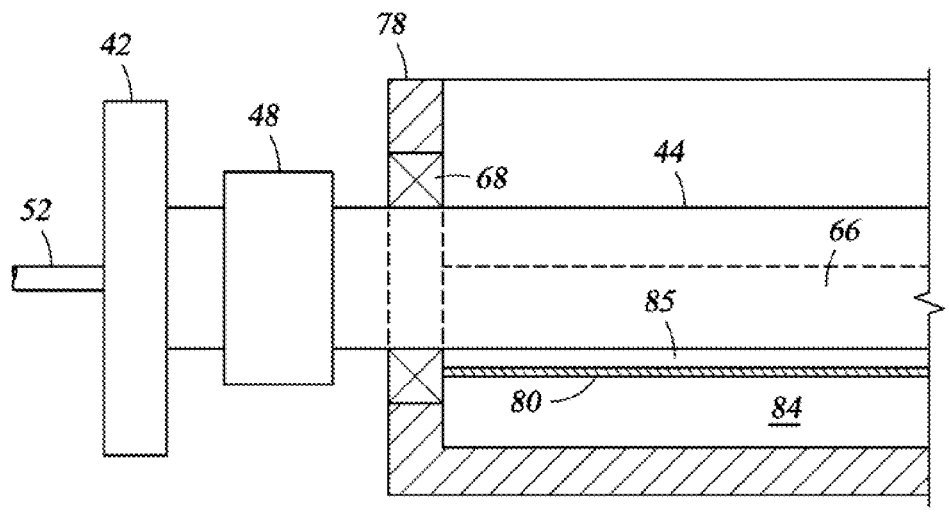
FIG. 4 is a side partial sectional view of a portion of the filament winding system of FIG. 2.

Referring now to FIG. 4, a side partial sectional view is shown of an end of the mandrel 44 projecting through the end of the trough 64. In this example, the outer circumference of the mandrel 44 is shown pressed within a sealing bearing 68 inserted within an end wall of the housing 78. The level of polymer matrix 66 partially submerges the mandrel and a layer of film 85 is shown beneath the mandrel 44 and the membrane 80. The membrane 80 is sealingly attached along the end wall of the housing 78 thereby preventing leakage of the polymer matrix 85 into the space 84.

Figure 5:
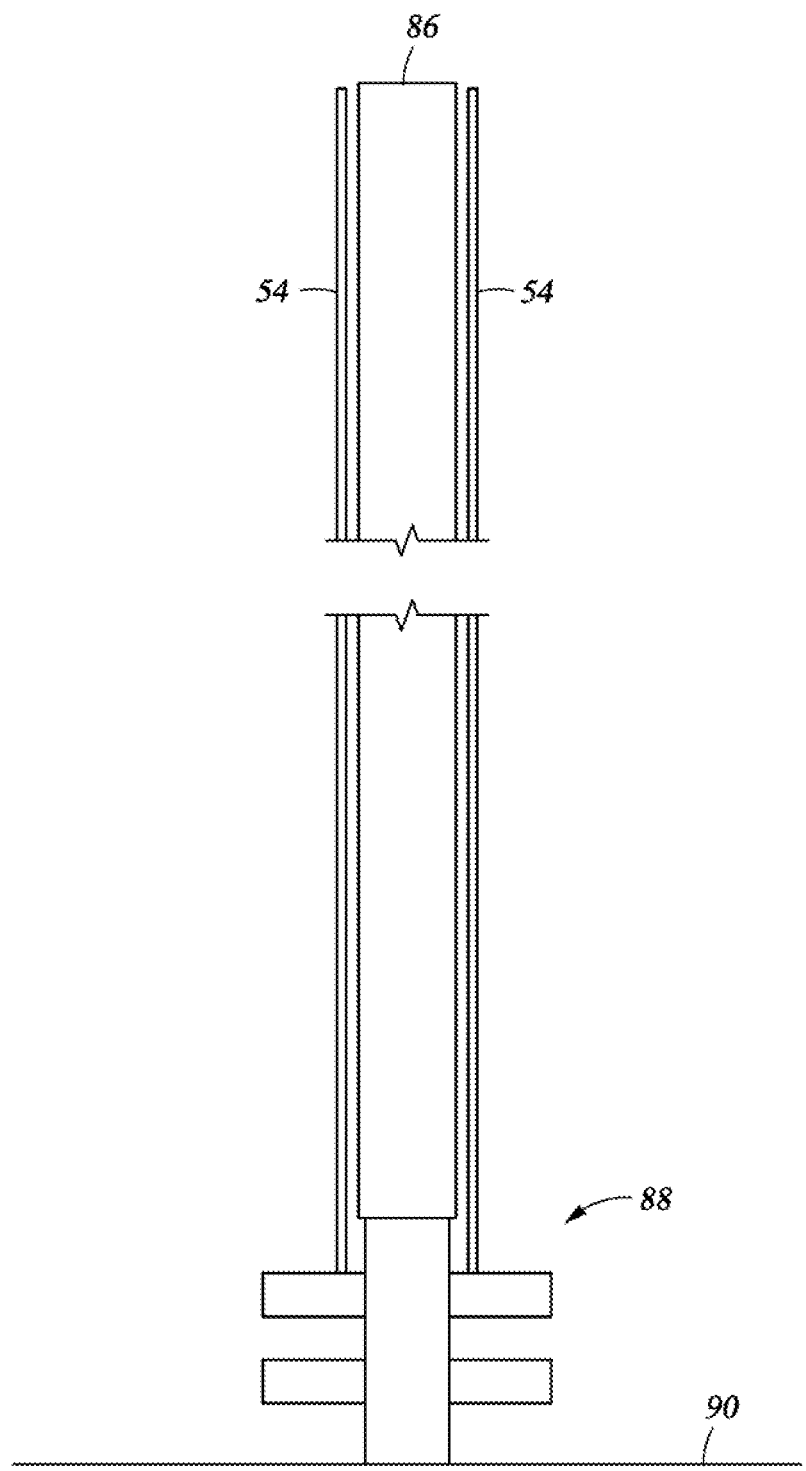
FIG. 5 is a side view of an example of a composite tubular, in use, and formed from the filament winding system of FIG. 2.

FIG. 5 schematically provides an example of use of a composite tubular 54 where a portion of a drilling system is illustrated having a vertical riser 86 mounted into a subsea well assembly 88. Attached to and parallel with the riser 86 are composite tubulars 54 formed from the above-described process. Subsea wellhead assembly 88 is mounted on the subsea floor 90. An advantage of employing a composite tubular 54 in this application is lines, such as choke and kill lines used in conjunction with these drilling systems, although having an inner diameter much less than the riser 86, have a large thickness to accommodate the high pressures experienced within. As such, the weight of the choke and kill lines may exceed that of the associated riser 86. Implementation of a composite tubular 54 for use as a choke and kill line, however, can produce choke and kill lines having a weight less than that of an associated riser 86. Reduced weight lines can increase ease of handling presently designed systems as well as safety. Additionally, the lighter composite tubulars can allow for drilling operations at previously unattainable depths.

The present system and method described herein, therefore, is well adapted to carry out and attain the ends and advantages mentioned, as well as others inherent therein. While a presently preferred embodiment has been given for purposes of disclosure, numerous changes exist in the details of procedures for accomplishing the desired results. For example, springs and/or pneumatically actuated pistons can be used with or in place of the pressurized fluid in the space 84. These and other similar modifications will readily suggest themselves to those skilled in the art, and are intended to be encompassed within the spirit of the present invention disclosed herein and the scope of the appended claims.

What is claimed is:

1. A filament winding system comprising:
    a trough having a frame with a longitudinal axis and opposing ends and a flexible membrane with a mid-portion depending within the frame;
    a rotatable mandrel having opposing ends mounted to ends of the frame and supported within the mid-portion of the flexible membrane;
    a filament supply; and
    filaments extending from the filament supply, so that when the mandrel is rotated, the filaments wind around the mandrel to form a composite tubular on the mandrel.

2. The filament winding system of claim 1, wherein the mandrel is elongate so that when only the ends of the mandrel are supported, a middle portion of the mandrel sags below the ends of the mandrel.

3. The filament winding system of claim 2, wherein when the mandrel is supported by the membrane, the mandrel extends along an axis that is substantially straight.

4. The filament winding system of claim 1, further comprising a liquid polymer matrix contained in the trough through which the filament extends, the liquid polymer forming a fluid film between the membrane and the mandrel and the composite tubular and the membrane.

5. The filament winding system of claim 1, wherein the membrane has a catenary cross section thereby forming a trough in the membrane.

6. The filament winding system of claim 5, further comprising a trough housing having sidewalls with upper ends from which the membrane is supported thereby defining a space between the membrane and the housing.

7. The filament winding system of claim 6, further comprising a pressurized fluid in the space.

8. The filament winding system of claim 1, wherein the membrane has a length that is greater than a length of the composite tubular.

9. The filament winding system of claim 1, wherein the membrane comprises a central portion that is a segment of a cylinder, the segment being coaxial with the longitudinal axis.

10. The filament winding system of claim 1, wherein the ends of the frame comprise passages through which the mandrel extends, and rotating seals in the passages that form a sealing barrier against polymer matrix leakage as the mandrel is rotated within the membrane.

11. A filament winding system comprising:
    a frame having lateral sides and ends that define an enclosure therein;
    a flexible membrane supported on the frame and having a mid-portion suspended within the enclosure;
    an elongated rotatable mandrel having opposing ends mounted in the frame and at least a lengthwise portion of the mandrel between the opposing ends supported in the trough, and that when unsupported between the opposing ends, the lengthwise portion of the mandrel sags below the opposing ends;
    a filament source;
    filaments extending from the filament source onto the outer surface of the mandrel, so that when the mandrel is rotated the filaments wind around the mandrel to form a composite tubular; and
    a liquid polymer matrix contained in the membrane through which the filaments extend, the liquid polymer forming a fluid film between the membrane and the mandrel and the composite tubular and the membrane.

12. The filament winding system of claim 11, wherein the membrane is a segment of a cylinder and coaxial with an axis of the mandrel where the membrane supports the mandrel.

13. The filament winding system of claim 11, further comprising a chamber defined between the membrane and the frame and pressurized fluid in the chamber.

* * * * *